United States Patent [19]

Boenig

[11] Patent Number: 5,726,848
[45] Date of Patent: Mar. 10, 1998

[54] FAULT CURRENT LIMITER AND ALTERNATING CURRENT CIRCUIT BREAKER

[75] Inventor: Heinrich J. Boenig, Los Alamos, N. Mex.

[73] Assignee: The Regents of the University of California, Oakland, Calif.

[21] Appl. No.: 646,836

[22] Filed: May 8, 1996

[51] Int. Cl.$^6$ ............................................. H02H 3/00
[52] U.S. Cl. ........................ 361/93; 361/58; 361/115
[58] Field of Search ............................ 361/93, 58, 19, 361/18, 115

[56] References Cited

U.S. PATENT DOCUMENTS 3,723,816  3/1973  Pollard ........................................ 361/58
4,490,769  12/1984  Boenig ........................................ 361/58

Primary Examiner—Jeffrey A. Gaffin
Assistant Examiner—Stephen Jackson
Attorney, Agent, or Firm—Milton D. Wyrick; William A. Eklund

[57] ABSTRACT

A solid-state circuit breaker and current limiter for a load served by an alternating current source having a source impedance, the solid-state circuit breaker and current limiter comprising a thyristor bridge interposed between the alternating current source and the load, the thyristor bridge having four thyristor legs and four nodes, with a first node connected to the alternating current source, and a second node connected to the load. A coil is connected from a third node to a fourth node, the coil having an impedance of a value calculated to limit the current flowing therethrough to a predetermined value. Control means are connected to the thyristor legs for limiting the alternating current flow to the load under fault conditions to a predetermined level, and for gating the thyristor bridge under fault conditions to quickly reduce alternating current flowing therethrough to zero and thereafter to maintain the thyristor bridge in an electrically open condition preventing the alternating current from flowing therethrough for a predetermined period of time.

4 Claims, 6 Drawing Sheets

FAULT CURRENT LIMITER AND ALTERNATING CURRENT CIRCUIT BREAKER

This invention was made with Government support under Contract No. W-7405-ENG-36 awarded by the U.S. Department of Energy. The Government has certain rights in the invention.

FIELD OF THE INVENTION

The present invention generally relates to electrical power system circuit protection devices, and, more specifically to solid-state current limiters and circuit breakers.

The electrical utility industry of the United States as well as the electrical utility industries throughout the industrialized world are continually trying to upgrade the quality of electrical service they provide. In some systems, this may be primarily service to residences and small businesses, while in others electrical services to manufacturing plants and hospitals may be critical. In serving high technology manufacturing plants, the potential exists for losses in the millions of dollars due to equipment failures and production shutdowns resulting from power interruptions.

One critically important component of all electrical utility systems is the circuit breaker, a component which will open a line serving a fault such as a short circuit to isolate the line from the remainder of the system. Quick isolation of the faulted line by the circuit breaker will help maintain service to customers served by other lines.

However, the continuing growth of most electrical power generation and transmission systems has resulted in higher levels of available fault currents and correspondingly greater demand on system protective components. To handle these higher available fault current levels, some utilities have tried to develop and retrofit higher current interrupting rated circuit breakers, but, for most, this option is too costly. It is also possible to restructure some systems to reduce available fault currents, but this can destroy the advantages associated with tightly interconnected generation and transmission networks. One solution, solid-state fault current limiters which can be easily and cost effectively inserted into existing power system networks, can be extremely effective in providing system protection assuming they are simple, reliable and commercially viable.

One such solid-state circuit breaker with current limiting capabilities is described in U.S. Pat. No. 4,490,769 issued Dec. 25, 1984, to Boenig for "Solid-State Circuit Breaker With Current Limiting Characteristic Using A Superconducting Coil." This patent, issued to the inventor herein, discloses a thyristor bridge with a superconducting coil and a dc voltage source in series and connected across its ends in a manner to allow bi-directional ac current flow through the bridge under normal operating conditions. However, under fault conditions, a pair of thyristors always turns off, forcing the current to be limited by the bridge inductance. By using the input from a proper control circuit, the thyristors can be triggered to reduce the current flow therethrough to zero in fewer than two cycles and acting thereafter as an open circuit breaker. In the face of a temporary overload on the circuit, the control circuit triggers the thyristors so that ac current flow through them is limited to an acceptable level.

Although this particular current limiting breaker is efficacious and suitable for use in many electrical systems, its use of a superconducting coil and biasing voltage supply limits its applicability in other systems. The need for cooling to even the relatively high liquid nitrogen temperature of the high temperature superconductors can make this solid-state circuit breaker difficult to install and expensive to maintain.

It is therefore an object of the present invention to provide a solid-state circuit breaker with current limiting and controlling characteristics which does not require a biasing voltage or a superconducting inductor.

It is another object of the present invention to provide a solid-state circuit breaker with current limiting and controlling characteristics which can interrupt a fault current in less than one cycle.

It is yet another object of the present invention to provide a solid-state circuit breaker with current limiting and controlling characteristics for responding rapidly and appropriately to normal, temporary overload and fault conditions.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

To achieve the foregoing and other objects, and in accordance with the purposes of the present invention, as embodied and broadly described herein, the apparatus of this invention comprises a solid-state circuit breaker and current limiter for a load served by an alternating current source having a source impedance, the solid-state circuit breaker and current limiter comprises a thyristor bridge interposed between the alternating current source and the load, the thyristor bridge having four thyristor legs and four nodes, with a first node connected to the alternating current source, and a second node connected to the load. A coil is connected from a third node to a fourth node, the coil having an impedance of a value calculated to limit current flowing therethrough to a predetermined value. Control means are connected to the thyristor legs for limiting the alternating current flow to the load under fault conditions to a predetermined level, and for gating the thyristor bridge under fault conditions to quickly reduce alternating current flowing therethrough to zero and thereafter to maintain the thyristor bridge in an electrically open condition preventing alternating current from flowing therethrough for a predetermined period of time.

In another aspect of the present invention, and in accordance with its principles and objects, a solid-state circuit breaker and current limiter for a load served by an alternating current source having a source impedance, the solid-state circuit breaker and current limiter comprises a thyristor bridge interposed between the alternating current source and the load, the thyristor bridge having four thyristor legs and four nodes, with a first node connected to the alternating current source, and a second node connected to the load. A coil is connected from a third node to a fourth node, the coil having an impedance of a value to limit current flowing therethrough to a predetermined value. Control means are connected to the thyristor legs for limiting the alternating current flow to the load under temporary overload conditions to a predetermined level, and for gating the thyristor bridge under the temporary overload conditions to quickly limit the alternating current flowing therethrough to the predetermined level and thereafter to maintain the maintain the predetermined level for the duration of the temporary overload condition.

BRIEF DESCRIPTION OF THE DRAWINGS

The accompanying drawings, which are incorporated in and form a part of the specification, illustrate the embodiments of the present invention and, together with the description, serve to explain the principles of the invention. In the drawings.

DETAILED DESCRIPTION

The present invention presents a solid-state circuit breaker and current limiter which can open an electrical circuit in less than one cycle. In the time before current interruption is completed, the current in the circuit is already limited, another attractive feature of the present invention. This is accomplished through the arrangement of thyristors and a coil and the novel control of the thyristors. The invention most easily can be understood through reference to the drawings.

Figure 1:
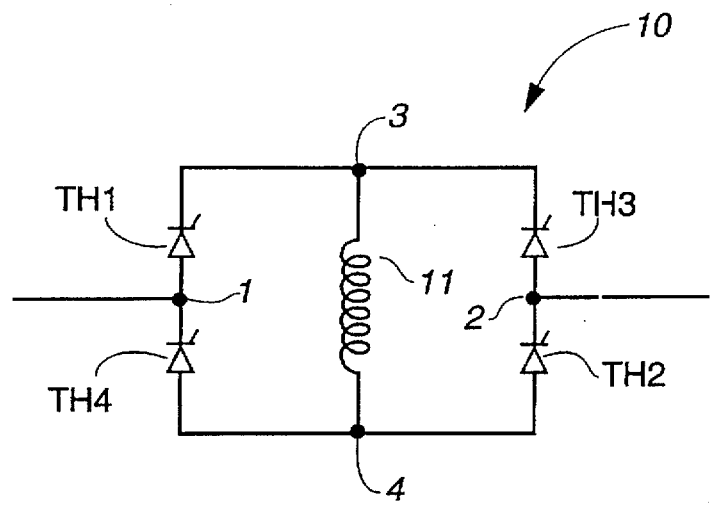
FIG. 1 is a schematic of the thyristor bridge/inductor circuit according to the present invention.

In FIG. 1, a schematic illustration of thyristor bridge/ inductor 10 is illustrated. Thyristor bridge/inductor 10 includes a thyristor bridge of thyristor strings TH1, TH2, TH3, and TH4 defining nodes 1–4. Within the thyristor bridge of TH1, TH2, TH3, and TH4, inductor 11 is connected between node 3 and node 4. The actual inductance of inductor 11 is determined by calculation to limit the current flowing through inductor 11 to a desired predetermined value.

Figure 2:
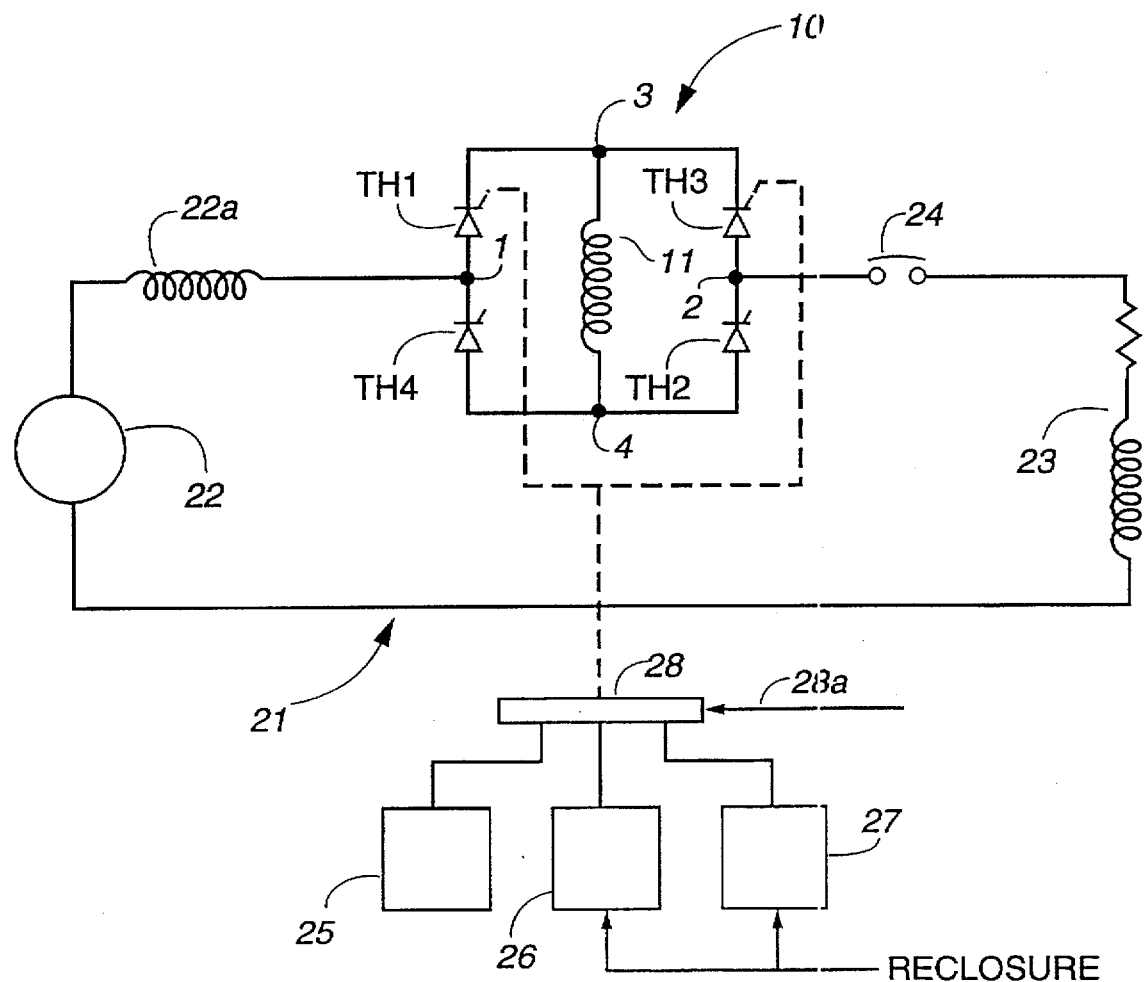
FIG. 2 is schematic of the thyristor bridge/inductor circuit of FIG. 1 installed into a generator to load electrical system along with a block diagram illustrating the functional control system for the thyristors.

Turning now to FIG. 2, there can be seen thyristor bridge/inductor 10 inserted into a schematic drawing of a typical generator to load circuit 21. Here, generator 22, through its associated source impedance 22a, is connected to node 1 of thyristor bridge/inductor 10, and load 23, through conventional circuit breaker 24 is connected to node 2. Shown as a block diagram are the components of the control system applied to thyristors TH1, TH2, TH3, and TH4 for the three states possible with the present invention: normal operation 25, fault current limiting 26 and fault current interruption 27, which are each connected to switching matrix 28.

Switching matrix 28, under direction of mode selection 28a, provides the appropriate mode gating signals to each thyristor TH1, TH2, TH3, and TH4, depending on the conditions being experienced. The selection of particular modes is determined by the amplitude of the line current as will be described more fully hereinafter. The three possible modes are the normal operation mode, the fault current limiter mode, and the fault current interrupter mode.

Figure 3:
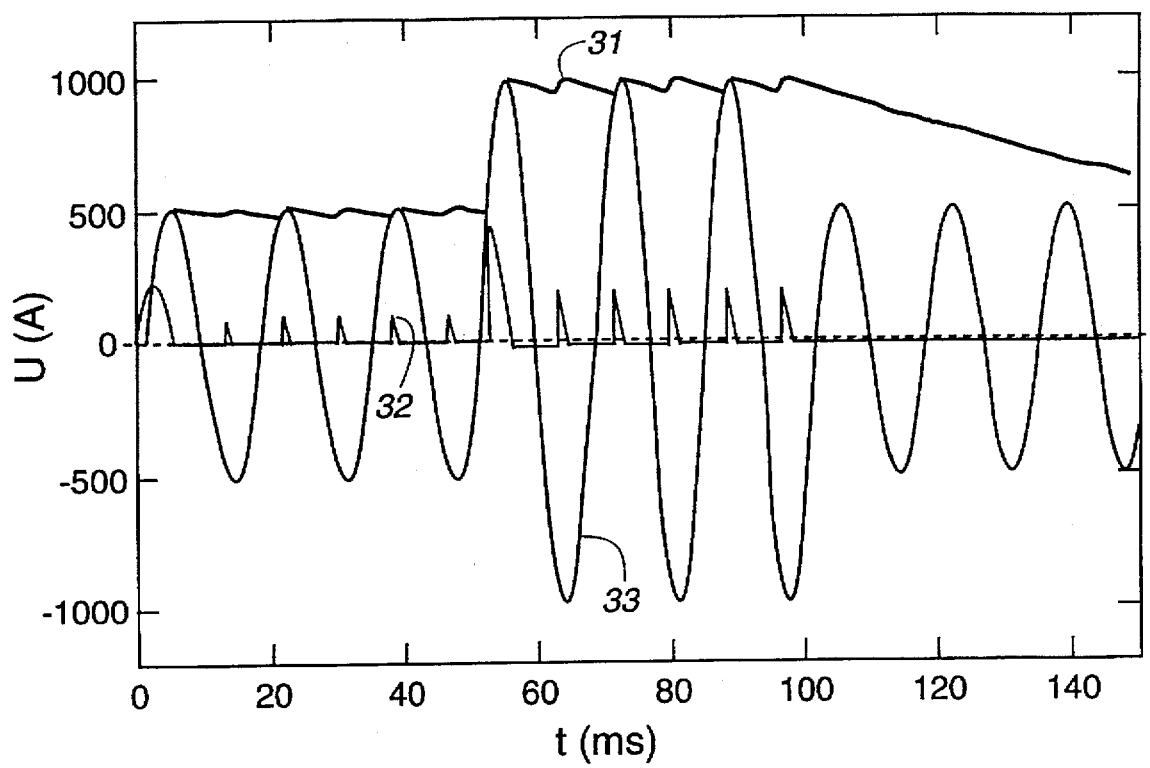
FIG. 3 is a plot of line current, inductor current and inductor voltage under normal line operation, with the line current increasing from half load to full load and back to half load with no bias supply in the circuit.

FIG. 3 illustrates the current 31 in and the voltage 32 across inductor 11 (FIG. 2), as well as line current 33, under the conditions of line current 33 transitioning from a one-half load condition to a full-load condition and then back to one-half load. For the traces of FIG. 3, a bias voltage was not used. It should be noted that, with respect to the alternating current generator to load circuit 21 of FIG. 2, inductor 11 basically is not in the circuit and does not impede the flow of the alternating current through circuit 21 as long as the current in circuit 21 is less than a predetermined current limit, $I_{LIM}$. This $I_{LIM}$ could be any reasonable overcurrent, such as 20% above the rated current for circuit 21.

In the invention, however, inductor 11 is recharged once each alternating current cycle as illustrated in FIG. 3 by the inductor 11 voltage spikes 34. Inductor 11 is recharged to the maximum current, which is identical to the maximum current in circuit 21, because of losses in circuit 21, in thyristors TH1 through TH4, and in inductor 11. Once in each alternating current cycle a set of thyristors, either TH1 and TH2 or TH3 and TH4, is turned off, so that this recharging of inductor 11 can be accomplished. Thereafter, once inductor 11 again is charged to the current in circuit 11, the set of thyristors which was turned off must be turned back on when the thyristor voltage again becomes forward biased.

Figure 4:
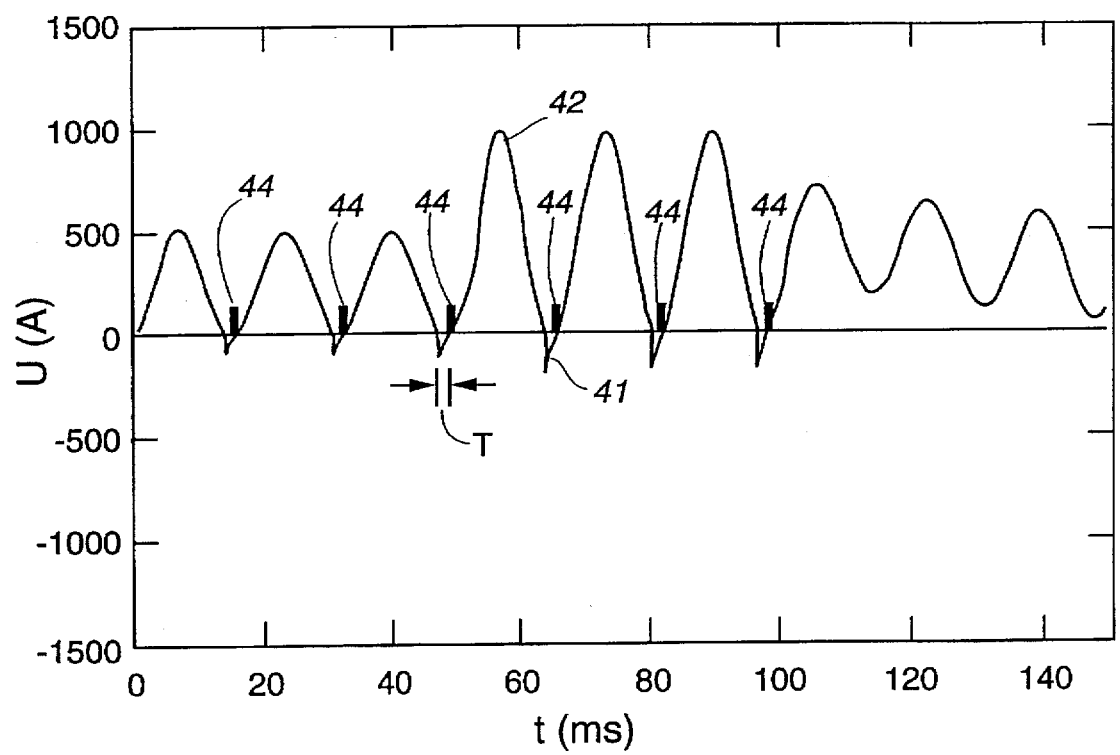
FIG. 4 is plot of thyristor 1's current and voltage and the gate pulses to the thyristor for normal line operation with the line current increasing from half load to full load, and then reverting back to half load.

FIG. 4 illustrates the voltage 41 and current 42 for any one thyristor in thyristor bridge/inductor 10. As illustrated, there are brief periods, T, during a cycle, when current 42 ceases to flow in a thyristor, and the thyristor becomes reverse biased. It is for this reason that gate pulses 44 are provided each cycle, when voltage 41 again becomes positive, to turn the thyristor back on.

Figure 5:
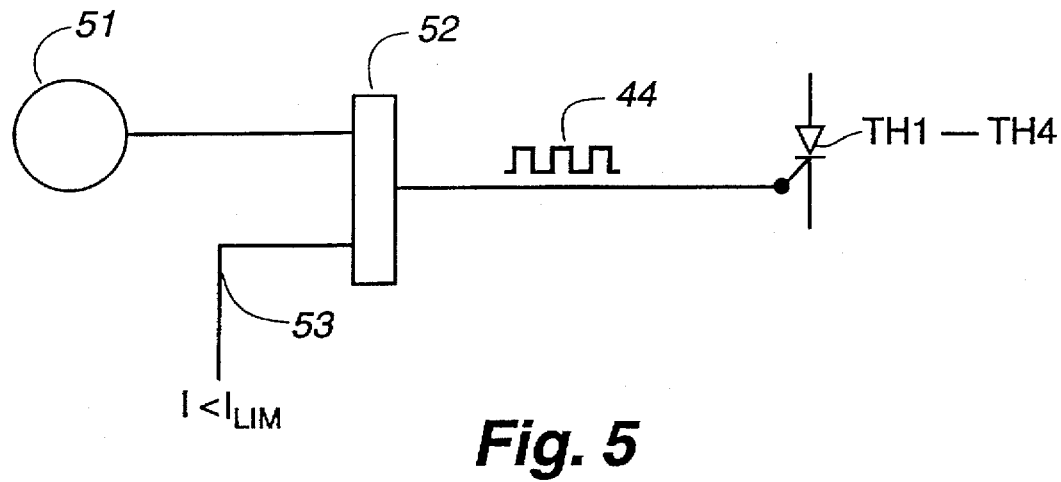
FIG. 5 is a logic diagram illustrating one method of gating all thyristors in the bridge under normal line operation through the use of a continuous pulse train.

Switching matrix 28 contains the logic components that provide the mode gating signals, and are more particularly described in the figures. FIG. 5 illustrates the schematic for the normal mode of operation to provide gate pulses 44 to each thyristor, TH1 through TH4, as shown in FIG. 4 for any one thyristor. As shown, pulse train source 51 is input to AND gate 52 along with current signal 53 indicating the current in circuit 21 (FIG. 2) is less than $I_{LIM}$. As long as this is true, gate pulses 44 will pass to each thyristor, TH1 through TH4, turning each back on during each cycle, as illustrated in FIG. 4.

Figure 6:
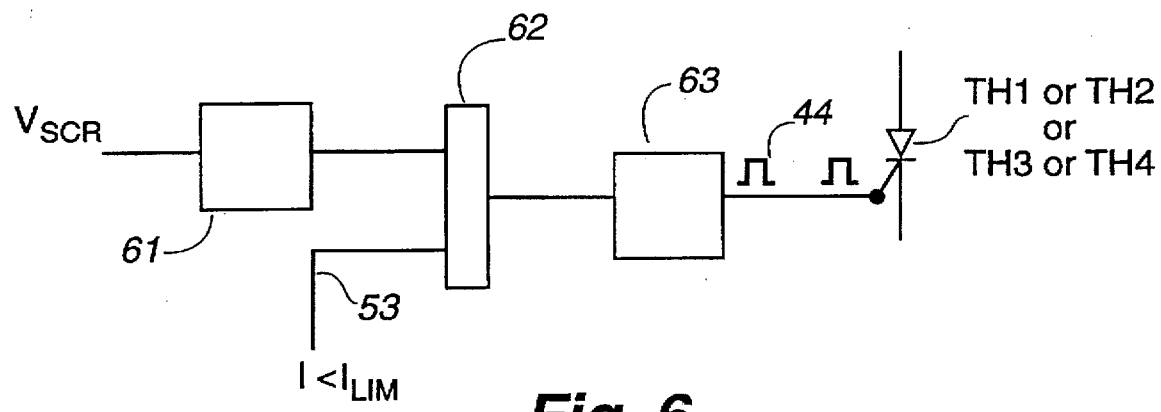
FIG. 6 is a logic diagram illustrating another method of gating the thyristors with individual gate pulses produced when the voltage across the thyristor is positive.

Another method of producing these gate pulses 44 is shown in FIG. 6. Here, the voltage across a thyristor, $V_{SCR}$, is input to comparator 61, which produces an output when $V_{SCR}$ first turns positive each cycle. The output of comparator is provided to AND gate 62 along with current signal 53 (as in FIG. 5) indicating that $I_{CIR} < I_{LIM}$. With these conditions met, AND gate 62 outputs to monoshot circuit 63, which produces a gate pulse 44 to each respective thyristor. Although each of the circuits illustrated in FIGS. 5 and 6 effectively will provide gate pulses 44, the circuit of FIG. 5 probably is the easier to effectuate.

The various signals, $I_{CIR}$ and $V_{SCR}$, are simply obtained with current transducers (not shown) providing the needed values. The $I_{LIM}$ signal could be obtained in any convenient manner.

Figure 7:
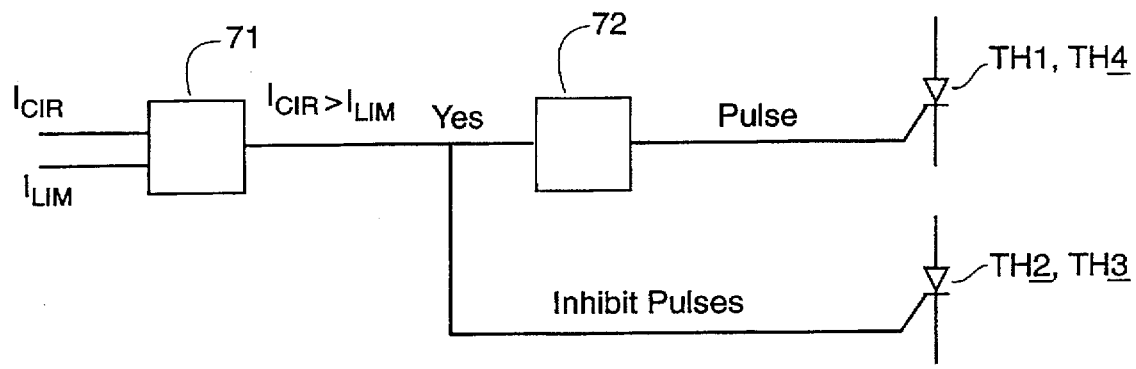
FIG. 7 is a logic diagram illustrating the gating pulses to the indicated thyristors when in the fault current interrupting mode of operation.

When the current in circuit 21 (FIG. 2), $I_{CIR}$, becomes greater than $I_{LIM}$, thyristor bridge/inductor 10 must go into the fault current interrupter mode, in which thyristor bridge/inductor 10 acts as a circuit breaker. The logic circuitry, illustrating one method of entering this mode, is shown in FIG. 7. Here, $I_{CIR}$ is compared to $I_{LIM}$ in comparator 71, which provides a "yes" output when $I_{CIR}<I_{LIM}$. This "yes" output is provided to monoshot circuit 72, which in turn provides a gate pulse to, for example, TH1 and TH4. The "yes" output is also provided as a continuous signal to, for example, TH2 and TH3, inhibiting pulses in that set of thyristors. By inhibiting the gating pulses in one set of thyristors, the current in inductor 11 (FIG. 2) will flow as a free-wheeling current in the other set of thyristors, reducing the current in circuit 21 (FIG. 2), $I_{CIR}$, to zero in less than one cycle.

There are, of course, other methods of providing the pulses appropriate for this fault current interrupting mode. However, most would be more complicated, and require additional voltage or current transducers. In any event, all of the possible methods for accomplishing this function are encompassed by the present invention.

Figure 8:
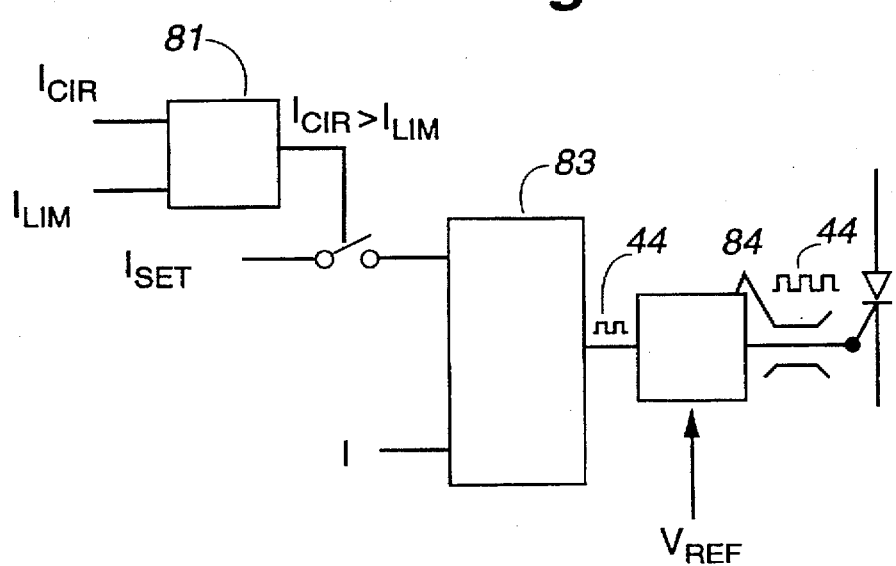
FIG. 8 is a logic diagram illustrating the gating pules to the thyristors when in the fault current limiting mode of operation.

The present invention also can provide current limiting functions as will be described. As opposed to the above-described normal operation mode and the fault current interrupter mode, which are realized through predetermined gating, the current limiting mode uses an automatic current control loop to determine the gating. Referring to FIG. 8, there can be seen a logic diagram for providing the necessary gate pulses to thyristors, TH1 through TH4, for fault current limiting. As shown, comparator 81 has $I_{CIR}$ and $I_{LIM}$ input, and produces an output when $I_{LIM}>I_{CIR}$. This output of comparator 81 is provided to controlled switch 82 causing it to close and connect the $I_{SET}$ signal to controller 83. Also input to controller 83 is the $I_{CIR}$ Signal.

The $I_{SET}$ signal will usually be different than the $I_{LIM}$ signal. For example, $I_{LIM}$ might be set to a current 20% greater than the rated $I_{CIR}$, while $I_{SET}$ might be a current which is 5 times the rated $I_{CIR}$.

Controller 83 compares $I_{SET}$ with $I_{CIR}$ and shifts gate pulses 44 until the difference between $I_{SET}$ and $I_{CIR}$ is zero. Gate pulses 44 are being provided to the appropriate thyristor once each cycle, and are referenced to the signal $V_{REF}$ in gate control logic and inversion limiter 84. The $V_{REF}$ signal is a reference voltage which can be the filtered alternating current voltage measured across thyristor bridge/inductor 10. Gate control logic and inversion limiter 84 outputs four (4) gate pulses 44, two (2) of which are identical.

In the case of a high impedance fault, where the fault current is higher than $I_{LIM}$ but lower than $I_{SET}$, controller 83 regulates the fault current according to the protection philosophy of the affected utility system. One possible approach would be to control bridge/inductor circuit 10 (FIG. 2) as if it were not in the utility circuit by gating thyristors, TH1 through TH4, so that line current could flow unimpeded therethrough. Standard gating limits, such as to avoid commutation failure, are included in gate control logic and inversion limiter 84.

Automatic reclosure is a feature of many current circuit breakers. The concept behind automatic reclosure is that once a short circuit occurs on a transmission line, such as a tree limb falling across a pair of electrical conductors, the affected circuit breaker will open, interrupting the fault current. From utility experience, it is known that a reasonable probability exists that the fault will clear in a short period of time. Because of this likelihood, most circuit breakers will reclose at least once in the period following the fault. However, if the fault persists after reclosing, the breaker will reopen and stay open.

The present invention provides this reclosure function by utilizing the fault current interrupter mode of operation logic (FIG. 7) along with the fault current limiter mode of operation (FIG. 8). In the event of a fault, the fault current limiter mode is selected and gating would be provided to thyristors, TH1 through TH4, as illustrated in FIG. 8, for that mode for a few hundred milliseconds after the fault. After that period of time, the fault current interrupter mode would be employed, as shown in FIG. 7, to reduce the line current to zero. After a predetermined period of time, thyristors, TH1 through TH4, would be gated to return to the normal mode of operation (FIGS. 5 and 6). If the fault is still present, gating would return thyristors, TH1 through TH4, to the fault current limiter mode until the fault current interrupter mode interrupts the fault current and maintains the circuit in zero current condition.

Figure 9:
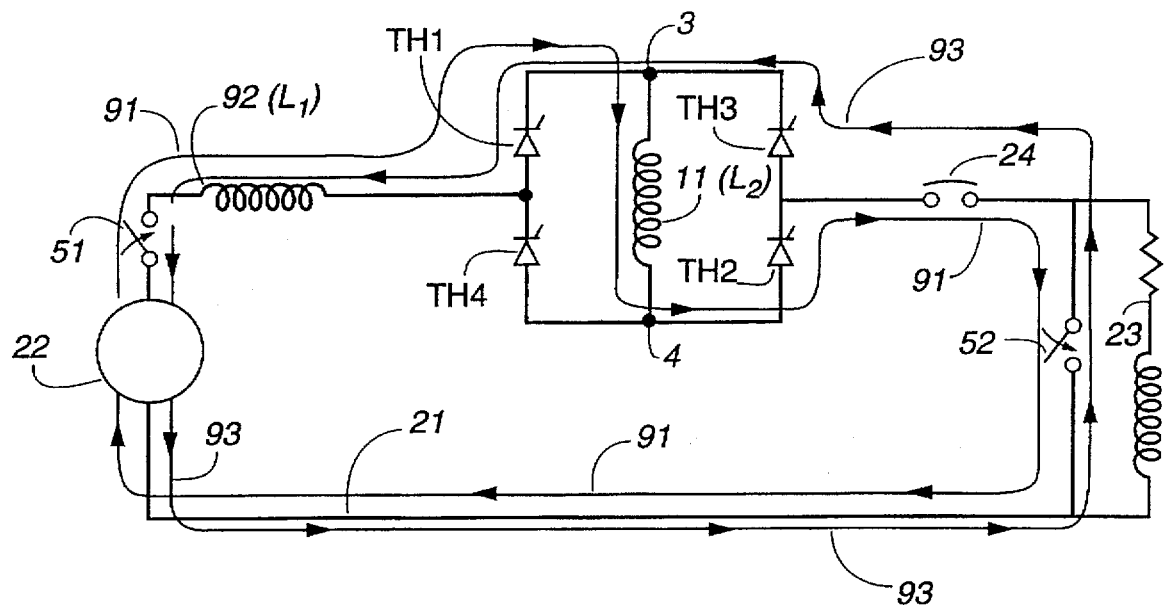
FIG. 9 is a schematic and waveform plot illustrating the operation of the current invention in the event of a fault downstream of the breaker and current limiter of the present invention, with line current interruption in less than one cycle.
Figure 9:
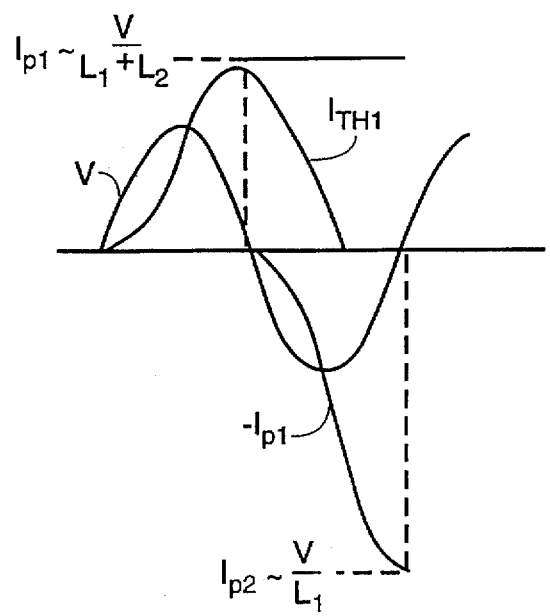

Reference should now be made to FIG. 9 where a schematic of a typical alternating current circuit similar to that shown in FIG. 2 is illustrated along with a voltage and current plot. FIG. 9 is used to further explain the operation of the fault current interrupter mode of the present invention and its commutation behavior. To understand this mode, one first assumes that at time equal zero, switches S1 and S2 close, providing a short circuit from the no-load condition. A positive voltage half-wave, shown in the plot, is across circuit 21, and thyristors, TH1 and TH2, are forward biased.

If thyristors, TH1 and TH2, are gated at time equal zero, current 91 will flow limited by line inductance 92 and inductor 11. Because the circuit voltage time area is positive, current 91 will increase to a maximum value. At the time current 91 attains its maximum, thyristors, TH3 and TH4, become forward biased. However, if only thyristor TH3 is gated, the negative voltage across the circuit will drive current 93 through thyristor TH3 and through still conducting thyristor TH1. This negative current 93, referred to as a commutation current, increases faster than current 91 because it is limited only by line inductance 92. With negative current 93 flowing as shown, current 91 through thyristor TH1 decreases to zero. As soon as the current through thyristor TH1 reaches zero, it will cease to conduct and block further current flow. With thyristor TH1 blocking, and thyristor TH4 never having been turned on, current 93 becomes zero.

The foregoing description of the preferred embodiments of the invention have been presented for purposes of illustration and description. It is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A solid-state circuit breaker and current limiter for a load served by an alternating current source having a source impedance, the solid-state circuit breaker and current limiter comprising:

a thyristor bridge interposed between said alternating current source and said load, said thyristor bridge having four thyristor legs and four nodes, with a first node connected to said alternating current source, and a second node connected to said load;

a coil connected from a third node to a fourth node, said coil having an impedance of a value calculated to limit current flowing therethrough to a predetermined value;

control means connected to said thyristor legs for limiting said alternating current flow to said load under fault conditions to a predetermined level, and for gating said thyristor bridge under fault conditions to quickly reduce said alternating current flowing therethrough to zero and thereafter to maintain said thyristor bridge in an electrically open condition preventing said alternating current from flowing therethrough for a predetermined period of time.

2. The apparatus as described in claim 1 wherein said control means under said fault conditions quickly reduces said alternating current flow to zero in less than one alternating current cycle.

3. A solid-state circuit breaker and current limiter for a load served by an alternating current source having a source impedance, the solid-state circuit breaker and current limiter comprising:

a thyristor bridge interposed between said alternating current source and said load, the thyristor bridge having four thyristor legs and four nodes, with a first node connected to said alternating current source, and a second node connected to said load;

a coil connected from a third node to a fourth node, the coil having an impedance of a value to limit current flowing therethrough to a predetermined value;

control means connected to said thyristor legs for limiting said alternating current flow to said load under temporary overload conditions to a predetermined level, and for gating said thyristor bridge under the temporary overload conditions to quickly limit the alternating current flowing therethrough to said predetermined level and thereafter to maintain said predetermined level during said temporary overload condition.

4. The apparatus as described in claim 3 wherein said control means under temporary overload conditions quickly limits said alternating current flowing therethrough to said predetermined level within one alternating current cycle.

\* \* \* \* \*